April 6, 1965     R. T. HALSTRICK     3,177,035
STOOLS
Original Filed May 2, 1963
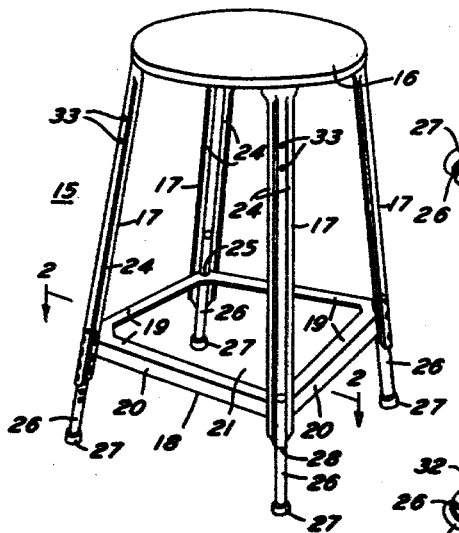
FIG.1
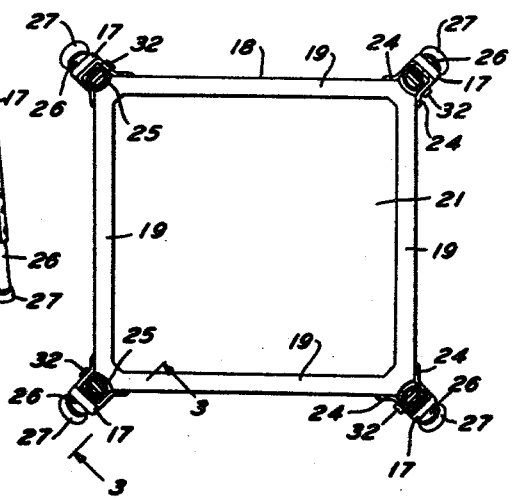
FIG.2
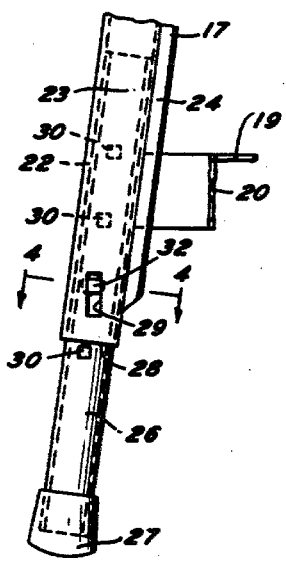
FIG.3
FIG.4
FIG.5
INVENTOR.
ROBERT T. HALSTRICK
BY
ATTORNEY April 6, 1965 R. T. HALSTRICK 3,177,035
STOOLS
Original Filed May 2, 1963 2 Sheets-Sheet 2
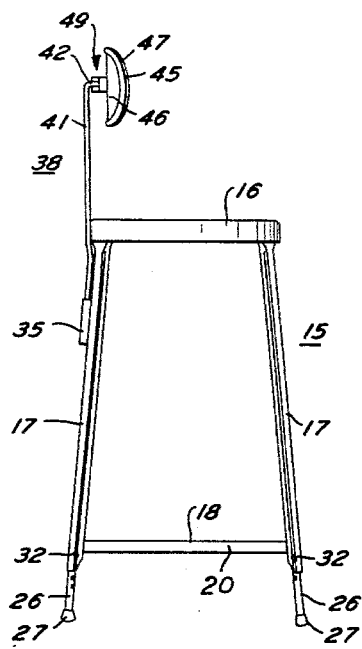
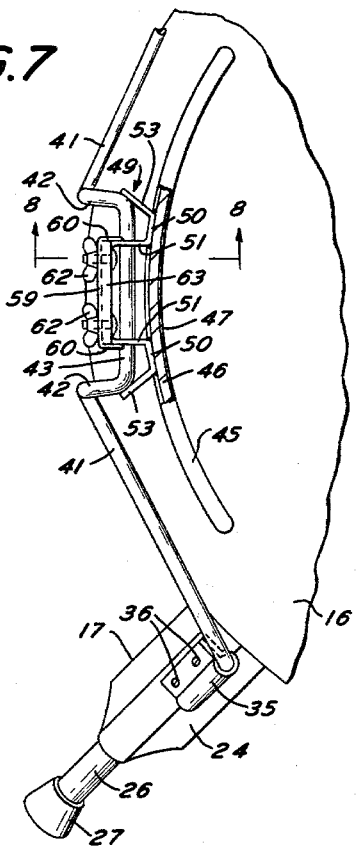
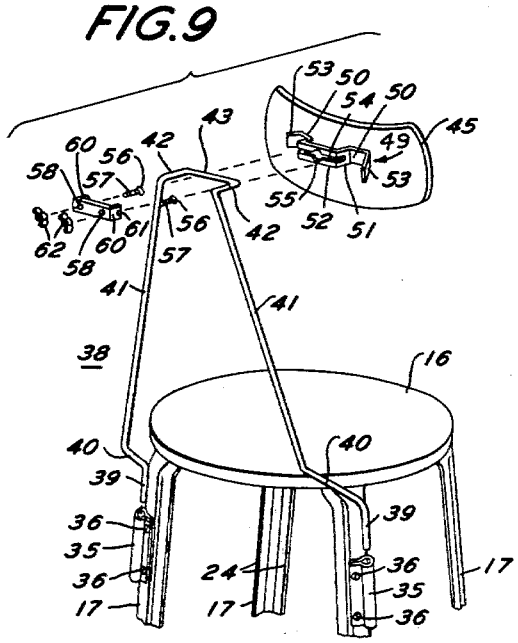
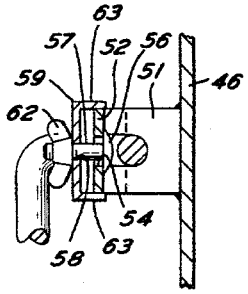
INVENTOR.
ROBERT T. HALSTRICK
BY
ATTORNEY

3,177,035
STOOLS

Robert T. Halstrick, Huntingdon Valley, Pa., assignor to American Metal Works, Inc., Philadelphia, Pa., a corporation of Pennsylvania
Original application May 2, 1963, Ser. No. 277,546. Divided and this application Nov. 22, 1963, Ser. No. 325,602
1 Claim. (Cl. 297—451)

This invention relates to stools primarily for shop use and is division of my prior application filed May 2, 1963, Serial No. 277,546.

Stools used in work shops frequently require adjustments as to height upon change of shift or upon change of the operations to be performed. Such stools also, are frequently provided with or workers desire the attachment thereto of adjustable backrests.

It is the principal object of the present invention to provide improvements in stools for industrial or shop use with which a quick adjustment of seat height can be effected.

It is a further object of the present invention to provide improvements in stools for industrial or shop use having a self-locking height adjustment of the stool seat.

It is a further object of the present invention to provide a stool having a self-locking height adjustment which can be easily unlocked for setting to a different height.

It is a further object of the present invention to provide a stool and a back rest therefor which is quickly and easily applied.

It is a further object of the present invention to provide a stool and back rest of the character aforesaid which is quickly and easily adjustable with simultaneous adjustment of the back rest angle and locking of the adjustment at any desired angle.

Other objects and advantageous features of the invention will be apparent from the description and claim.

The nature and characteristic features of the invention will be more readily understood from the following description taken in connection with the accompanying drawings forming part thereof, in which:

FIGURE 1 is a view in perspective of a stool in accordance with the invention;

FIG. 2 is a horizontal sectional view, enlarged, taken approximately on the line 2—2 of FIG. 1;

FIG. 3 is a vertical sectional view, further enlarged, taken approximately on the line 3—3 of FIG. 2;

FIG. 4 is a horizontal sectional view, still further enlarged, taken approximately on the line 4—4 of FIG. 3;

FIG. 5 is a perspective view of a locking pin for height adjustment of the legs;

FIG. 6 is a side elevational view of the stool shown in FIG. 1 with the back rest in place;

FIG. 7 is an enlarged fragmentary horizontal view showing the details of the mounting of the back rest;

FIG. 8 is a fragmentary sectional view, enlarged, taken approximately on the line 8—8 of FIG. 7; and FIG. 9 is an exploded perspective view of the structure shown in FIGS. 6, 7 and 8.

It should, of course, be understood that the description and drawings herein are illustrative merely and that various modifications and changes can be made in the structure disclosed without departing from the spirit of the invention.

Like numerals refer to like parts throughout the several views.

Referring now more particularly to FIGS. 1 to 5, inclusive, of the drawings, a stool 15 is shown having a seat 16, of wood or other preferred material from which main legs 17 extend downwardly and outwardly.

At the lower ends of the main legs 17 a horizontal lower bracing frame 18 is provided, having horizontal wall portions 19 and vertical wall portions 20 and with an open central space 21.

Each of the main legs 17 is preferably formed as a metal stamping of channel section with a web 22 and side flanges 23 providing a square cross section. Rims 24 extend outwardly, in flared relation to the side flanges 23 for stiffening.

The wall portions 19 and 20 extend to and engage with the rims 23, and are secured thereto in any desired manner, such as by spot welding. The frame 18, at the corners, has openings 25 for the passage of leg extension tubes 26. The leg extension tubes 26 can be of any desired cross section but are preferably circular. At the lower ends of the tubes 26, rubber tips 27 can be provided if desired.

In order to position the tubes 26 longitudinally with respect to the main legs 17 the main legs 17, in spaced relation above the lower edge 28 thereof, are provided with opposite vertically elongated rectangular slot 29, the axis of the slots 29 preferably being vertical or plumb and accordingly in tilted relation to the web portions 22.

The extension tubes 26, at spaced locations, are preferably provided with opposite square openings 30, tilted with respect to the longitudinal axis of the tubes 26, and for selective alignment with the slots 29. Locking pins 32, insertable through the slots 29 and through a pair of openings 30 in the tubes 26, permit of height regulation of the seat 16.

A contiguous pair of main legs 17, at one side, are each provided with vertically spaced openings 33 for the attachment of back rest support hangers or sockets 35 by bolts 36.

The back rest structure, shown in detail in FIGS. 6 to 9, inclusive, includes a back support frame 38 of round wire having spaced downwardly extending lower ends 39 which engage in the hangers 35. The frame 38 has opposite rearwardly and upwardly extending portions 40, upright converging portions 41, horizontal forwardly extending arms 42 and a horizontal connecting and clamping rod portion 43.

The back rest 45, of any preferred shape, and preferably with an interior metal plate 46 covered with padding 47, is shown as arcuate in horizontal section.

A hanger 49 preferably made of a metallic strip has securing portions 50 shaped to conform to the rear of the plate 46, has rearwardly extending side sections 51, and a central section 52. Extending from the securing portions 51 angularly disposed or flared stops 53 are provided.

The central section 52 has a horizontal slot 54 therealong which extends into and forwardly along the side sections 51. The slot 54, intermediate its ends, has an enlarged opening 55 for the insertion of the head 56 of a bolt 57. A pair of bolts 57 extend forwardly through openings 58 in the body of a clamping cap 59. The cap 59 has rearwardly extending clamping arms 60 which extend along the side sections 51 and have recesses 61 to engage the rod portion 43 of the frame 38. Wing nuts 62, on the bolts 57 permit of tightening the cap 59 to the desired extent with the back rest 45 at a selected position in pivotal adjustment on the rod portion 43. The cap 59 preferably also has upper and lower rims 63 to facilitate the positioning of the cap 59.

It will thus be seen that the seat 16 can be adjusted to the desired height by insertion of the pins 32 through the slots 29 and selected openings 30. The weight of the user on the seat 16, by the downward force applied therefrom through the main legs 17 and the corresponding upward force applied through the tubes 26 effects a locking of the tubes 26 and legs 17. The lock can be released by a blow struck against the tops of the tubes 26 above the frame.

The back rest 45 can be readily mounted on the back support frame 38. For this purpose, the hanger 49 has the clamping rod portion 43 inserted thereinto and positioned sidewise by the flared stops 53. The bolts 57 are inserted into the slot 54. The enlarged opening 55 permits successive insertion of the bolt heads 56 and sliding of the bolts 57 away from the opening 55 on each side.

The clamping cap 59 is then put in place with the bolts 57 extending through the openings 58 and with the clamping arms 60 engaging the clamping rod 43 at the recesses 61. The wing nuts 62 are then applied to the bolts 57. The back rest 45 is then tilted as desired and adjustably locked in position upon tightening of the wing nuts 62.

I claim:

A stool having a seat, supporting legs for said seat, back rest support hangers mounted on a contiguous pair of said legs, a back support frame having its lower ends carried in said support hangers, said frame having a horizontal clamping rod portion supported above said seat, a back seat having a hanger with side sections extending horizontally therefrom with a central section connecting said side sections, said central and side sections having a slot for the reception of said clamping rod portion, a clamping cap engaging said clamping rod portion, bolts engaging said central section and said clamping cap and holding said clamping cap in clamped engagement with said clamping rod portion, said slot in said central section having an enlarged opening for insertion of the heads of said bolts, said hanger comprising a strip of material with side stops, and attaching portions between the side sections and the side stops and connected to the back rest.

References Cited by the Examiner

UNITED STATES PATENTS

| 1,407,896 | 2/22 | Spitz | 248—230 |
| 2,625,358 | 1/53 | Griffin | 248—226.4 |
| 2,711,787 | 6/55 | Hallowell et al. | 297—451 |
| 2,876,828 | 3/59 | Mayer | 297—451 |

FRANK B. SHERRY, *Primary Examiner.*